UNITED STATES PATENT OFFICE.

JOKICHI TAKAMINE, OF NEW YORK, N. Y., AND SADAKICHI SATOW, OF SENDAI, JAPAN.

PROCESS OF OBTAINING PROTEID MATTER FROM CORN.

1,275,324.   Specification of Letters Patent.   Patented Aug. 13, 1918.

No Drawing.   Application filed November 25, 1916. Serial No. 133,310.

*To all whom it may concern:*

Be it known that we, JOKICHI TAKAMINE and SADAKICHI SATOW, both subjects of the Emperor of Japan, and residing, respectively, at New York, in the county and State of New York, and Sendai, Japan, have made a certain new and useful invention in Process of Obtaining Proteid Matter from Corn, (Case F,) of which the following is a specification.

This invention relates to a process of obtaining proteid matter from corn, and consists substantially in the mode of operation hereinafter set forth and finally pointed out in the appended claims.

In carrying out our invention it is desirable, though not essential, to eliminate the bran and it is also desirable and important to remove the oil from the grains of corn. The bran forms the outer shell or skin of the grain, while the oil is carried in the elastic soft germ portion of the grain. In order to reduce the corn grains to a condition which permits the elimination of the bran and the freeing of the oil carrying germs the corn is steeped in water containing a suitable antiseptic, such as a small percentage of sulfurous acid, for a period of time, say two or three days, sufficient to cause the grains to swell up and become soft. The swollen and softened grains are then crushed into comparatively small pieces. This can be accomplished by passing the grain through a crushing mill. By thus breaking the grains into small pieces the bran peels off and the oil carrying germs, unbroken by the crushing operation, become detached from the body of the grains.

The next step in the carrying out of the invention is to separate the oil carrying germs from the crushed mass. This may be accomplished in many different ways. A simple and efficient method is to immerse the crushed mass in water and by agitating the mass the buoyant detached germs of the grain will float to the surface and may then be readily and easily removed in any convenient manner, and utilized according to ordinary methods for the recovery of the oils therefrom or for other purposes.

After the removal of the germs the remaining mass is ground fine with water and is then bolted through very fine mesh bolting cloth or silk in order to separate and remove the bran, which is collected and utilized in any desired manner and for any desired purpose for which bran is suited.

The liquid which passes through the bolting silk contains the starch and proteids of the corn grains. From this liquor the starch is separated and recovered in any suitable or convenient manner. A simple and effective method is to cause the liquor to flow in a thin sheet over an inclined surface of extended length to permit the starch to settle out of the liquor. After the starch has been removed the remaining liquor, which is yellowish and turbid, is permitted to stand whereupon the proteid matter settles to the bottom in the form of a thick mud-like sediment. The liquid is then decanted or otherwise removed or drawn off and the residue containing the proteid matter is suitably dried, or it may be compressed into cakes in any suitable manner, such as by being passed through a filter press. We will call this product "proteid meal." It constitutes about 8% of the original corn and consists roughly of 30% of starch cells and 40% to 50% of proteids and a small percentage of fibrous material.

The proteid meal produced as above described may then be subjected to suitable treatment to refine it. Various refining methods may be employed. According to one method the meal is treated with an alkaline solution such as a dilute solution of caustic or carbonated alkali, or caustic or carbonated ammonia. Refined proteid is then precipitated from the resulting liquid by an acid, such as sulfuric, sulfurous, acetic or phosphoric acid, or by a ferment, such as lactic or acetic, or, if desired, the proteids may be purified, before precipitation, by filtration, centrifuging, fractional precipitating, or after filtration by fractional solution of precipitated impure proteids, or by converting one or more components of the liquid into the chemical compounds with different properties which permit their separation. By thus purifying the liquid a refined proteid product is obtained which is suitable for use in the manufacture of various valuable commercial products, such as food products, celluloid-like substances, varnish, lacquer, artificial leather, artificial rubber and the like.

According to another method the proteid meal is extracted with water and the proteids are precipitated from the resulting liquid either directly or after being purified by physical means, such as filtration, centrifuging and the like, or by chemical means, such as, after rendering alkaline, by adding caustic or carbonated alkali or caustic or carbonated ammonia and precipitating with acid or a ferment, as above described.

According to still another method the meal is treated with an aqueous salt solution, such as sodium chlorid, ammonium sulfate, or the like, and the resulting liquid is further purified, if desired, in the same way as above described, and is then subjected to dialysis.

The refined proteid product produced as above described whether according to one or another of the methods referred to, is yellowish in color, tasteless, odorless, plastic and sticky when kneaded with alkaline reacting solution or phosphoric acid. It is soluble in all proteid solvents, shows all characteristic reactions of vegetable proteids, and when dissolved in alkalis and acids, respectively, it forms alkali salts and acid salts. It evolves ammonia gas when heated with hydroxid of alkali or of alkaline earths, and changes into a yellow mass when treated with concentrated nitric acid. It is easily rendered transparent, is adhesive and can be molded into permanent shape. When treated with suitable solvents it forms derivations of proteids which are flexible, elastic, adhesive, tough and strong.

If desired, the natural coloring matter of the corn may be eliminated by treating the crude proteid obtained as above described by means of an organic solvent such as alcohol or ether.

Having now set forth the objects and nature of our invention and the method of carrying out the same, what we claim as new and useful, and of our joint invention, is—

1. In the production of vegetable proteids from corn, the method which consists in softening the corn grains, then roughly crushing them and removing the oil carrying germs from the mass, then grinding the mass with water, then bolting the resulting liquor and removing therefrom the starch contained therein, and separating the solid matter from the remaining liquid, in the form of a "meal," then passing the meal into a liquid solution, and finally separating the proteidal contents of the liquid solution.

2. In the production of vegetable proteids from corn, the method which consists in softening the corn grains, then roughly crushing them and removing the oil carrying germs from the mass, then grinding the mass with water, then bolting the resulting liquor and removing therefrom the starch contained therein, and separating the solid matter from the remaining liquid, in the form of a "meal," then passing the meal into a liquid solution, then purifying the liquid solution, and finally separating the proteidal contents of the purified solution.

3. In the production of vegetable proteids from corn, the method which consists in softening the corn grains, then roughly crushing them and removing the oil carrying germs from the mass, then grinding the mass with water, then bolting the resulting liquor and removing therefrom the starch contained therein, and separating the solid matter from the remaining liquid, in the form of a "meal," then passing the meal into a liquid solution, and finally precipitating the proteidal contents of the liquid solution.

4. In the production of vegetable proteids from corn, the method which consists in softening the corn grains, then roughly crushing them and removing the oil carrying germs from the mass, then grinding the mass with water, then bolting the resulting liquor and removing therefrom the starch contained therein, and separating the solid matter from the remaining liquid, in the form of a "meal," then passing the meal into a liquid solution and finally precipitating with an acid the proteidal contents of the liquid solution.

5. In the production of vegetable proteids from corn, the method which consists in softening the corn grains, then roughly crushing them and removing the oil carrying germs from the mass, then grinding the mass with water, then bolting the resulting liquor and removing therefrom the starch contained therein, and separating the solid matter from the remaining liquid, in the form of a "meal," then passing the meal into a liquid solution, then purifying the liquid solution, and finally precipitating the proteidal contents of the purified solution.

6. In the production of vegetable protieds from corn, the method which consists in softening the corn grains, then roughly crushing them and removing the oil carrying germs from the mass, then grinding the mass with water, then bolting the resulting liquor and removing therefrom the starch contained therein, and separating the solid matter from the remaining liquid, in the form of a "meal," then passing the meal into a liquid solution, then purifying the liquid solution, and finally precipitating with an acid the proteidal contents of the purified solution.

7. In the production of vegetable proteids from corn the method which consists in softening the corn grains, then crushing the same and removing with water the germs of the corn grains, then grinding the mass with water and removing the bran and starch from the resulting liquor, then separating the solid substances remaining in the liquor, then passing the separated substances into a liquid solution and finally precipitating the proteidal contents of said liquid solution.

In testimony whereof we have hereunto set our hands on this 21st day of November, A. D. 1916.

JOKICHI TAKAMINE,
SADAKICHI SATOW.